US008074881B2

(12) United States Patent
Kurihara et al.

(10) Patent No.: US 8,074,881 B2
(45) Date of Patent: Dec. 13, 2011

(54) MERCHANDISE CHECKOUT SYSTEM

(75) Inventors: Norihiko Kurihara, Shizuoka (JP); Hitoshi Iizaka, Shizuoka (JP); Yoshiya Yamada, Shizuoka (JP); Hidemi Mihara, Shizuoka (JP); Osamu Tsuchiya, Shizuoka (JP); Hidehiro Naitou, Tokyo (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 351 days.

(21) Appl. No.: 12/361,711

(22) Filed: Jan. 29, 2009

(65) Prior Publication Data

US 2009/0194593 A1 Aug. 6, 2009

(30) Foreign Application Priority Data

Jan. 31, 2008 (JP) ................................ 2008-021973

(51) Int. Cl.
*G06K 7/10* (2006.01)
*G06K 15/00* (2006.01)

(52) U.S. Cl. ........................................ 235/383; 235/454

(58) Field of Classification Search .................. 235/383, 235/454, 462.01–462.49; 382/309–311
See application file for complete search history.

(56) References Cited

U.S. PATENT DOCUMENTS

| | | | | | |
|---|---|---|---|---|---|
| 5,083,638 | A | * | 1/1992 | Schneider | 186/61 |
| 5,393,965 | A | * | 2/1995 | Bravman et al. | 235/383 |
| 5,691,773 | A | * | 11/1997 | Wang et al. | 348/249 |
| 5,770,841 | A | * | 6/1998 | Moed et al. | 235/375 |
| 2004/0262391 | A1 | | 12/2004 | Harris et al. | |
| 2009/0188981 | A1 | | 7/2009 | Iizaka et al. | |
| 2009/0192909 | A1 | | 7/2009 | Iizaka et al. | |

FOREIGN PATENT DOCUMENTS

| | | |
|---|---|---|
| JP | 1-270184 | 10/1989 |
| JP | 4-42676 | 4/1992 |
| JP | 5-303660 | 11/1993 |
| JP | 2006-011898 | 1/2006 |
| JP | 2007072803 | 3/2007 |

OTHER PUBLICATIONS

Japanese Office Action for JP2008-021973 mailed on Sep. 1, 2009.
Chinese Office Action for 200910008420.3 mailed on Sep. 13, 2010.

* cited by examiner

*Primary Examiner* — Jamara Franklin
(74) *Attorney, Agent, or Firm* — Turocy & Watson, LLP

(57) ABSTRACT

When an error occurs in decoding of coded data such as a barcode, the error in the decoding of the coded data is analyzed based on an image acquisition status of the coded data in image data acquired by image acquisition performed by an image acquisition section. Then, handling information allowing the coded data to be decoded is provided depending on a result of the analysis.

8 Claims, 3 Drawing Sheets

MERCHANDISE CHECKOUT SYSTEM

CROSS-REFERENCE TO RELATED APPLICATION

This application is based upon and claims the benefit of priority from prior Japanese Patent Application No. 2008-021973, filed Jan. 31, 2008, the entire contents of which are incorporated herein by reference.

TECHNICAL FIELD

The present invention relates to a checkout system for items of merchandise that executes a settlement process of acquiring an image of at least coded data attached to an item of merchandise to acquire image data and decoding the coded data from the image data to determine the amount payable or the like of the item of merchandise.

BACKGROUND

In connection with a settlement operation for items of merchandise, a technique for facilitating the settlement process operation is disclosed in, for example, Jpn. Pat. Appln. KOKAI Publication No. 2007-72803. Jpn. Pat. Appln. KOKAI Publication No. 2007-72803 discloses an operation guidance display device that provides guidance indicating how to operate a settlement device that settles the amount payable of an item of merchandise.

However, with a single scanning operation performed by a cashier, an operation of acquiring an image of coded data attached to an item of merchandise and decoding the coded data from image data acquired by the image acquisition may fail. In this case, the cashier performs the scanning operation many times with the direction of the gripped item of merchandise with respect to a CCD scanner varied by, for example, rotating the item of merchandise.

Such a scanning operation may degrade the convenience of the settlement process operation for items of merchandise offered by a POS terminal, and reduce the efficiency of the settlement process operation. The scanning operation imposes an extra physical and mental burden on the cashier, who operates the POS terminal.

SUMMARY

An object of the present invention is to allow image acquisition to be performed in such a manner that coded data attached to an item of merchandise can be reliably decoded, to improve the convenience of a settlement process operation for items of merchandise, and to increase the efficiency of the settlement process operation.

A merchandise checkout system according to a first aspect of the present invention includes an image acquisition section which acquires at least coded data attached to an item of merchandise, a decoder which decodes the coded data from image data acquired by the image acquisition performed by the image acquisition section, and handling information providing section which, when an error occurs in the decoding of the coded data, analyzes the error in the decoding of the coded data based on an image acquisition status of the coded data in the image data and provides handling information allowing the coded data to be decoded depending on a result of the analysis.

A handling information providing method for merchandise checkout according to a second aspect of the present invention includes acquiring at least coded data attached to an item of merchandise to acquire image data on the coded data, decoding the coded data from the image data, and when an error occurs in the decoding of the coded data, analyzing the error in the decoding of the coded data based on an image acquisition status of the coded data in the image data and providing handling information allowing the coded data to be decoded depending on a result of the analysis.

DETAILED DESCRIPTION

An embodiment of the present invention will be described below with reference to the drawings.

Figure 1:
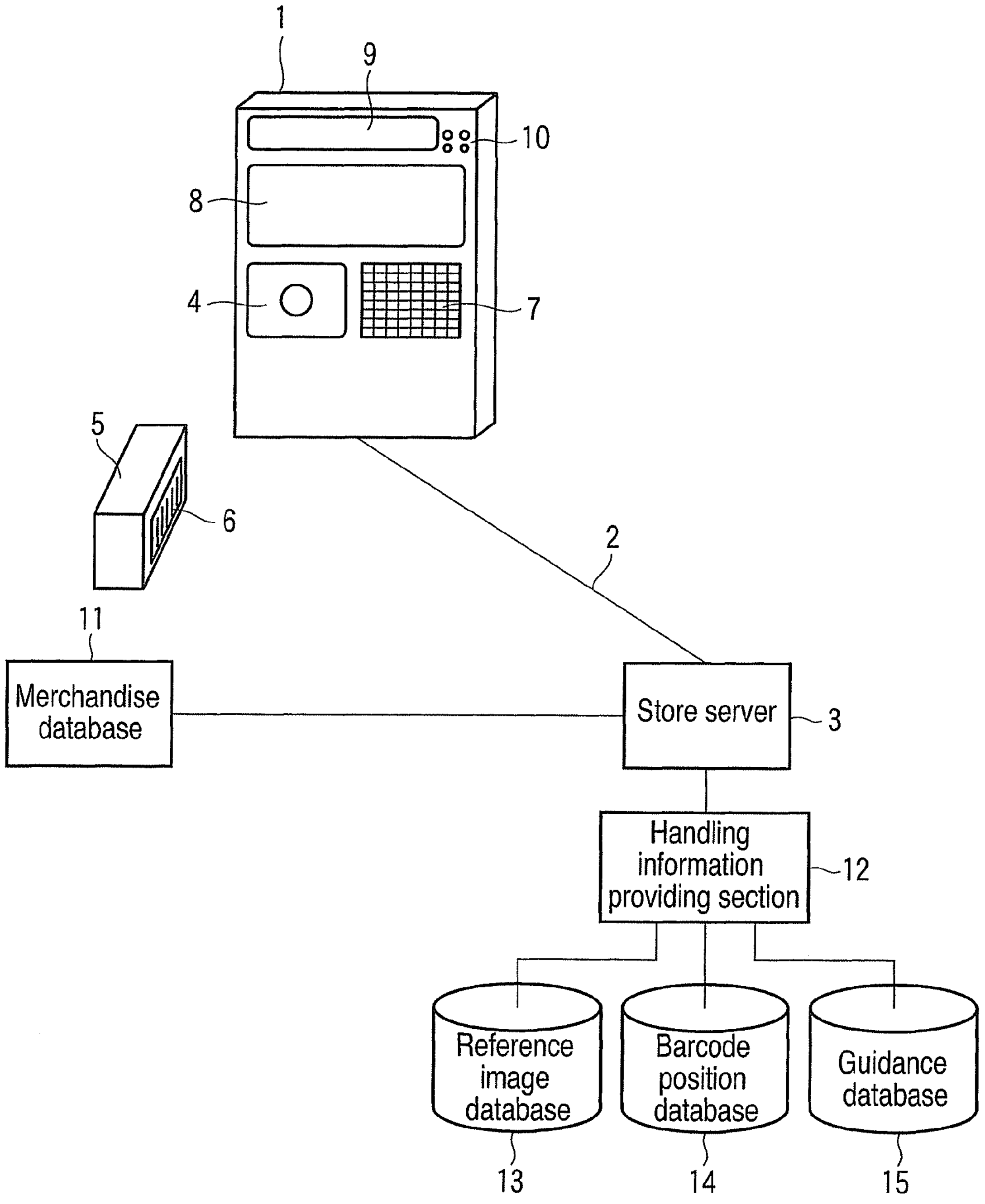
FIG. 1 is a diagram showing a configuration of an embodiment of a merchandise checkout system according to the present invention.

FIG. 1 shows a diagram of a configuration of a merchandise checkout system. The merchandise checkout system includes a POS terminal 1 serving as, for example, a coded data reading device, and a store POS server 3. The store POS server 3 is connected to the POS terminal 1 via an in-store local area network (LAN) 2. The POS terminal 1 includes a CCD scanner 4. The CCD scanner 4 acquires an image of coded data attached to an item of merchandise 5, for example, a barcode 6, to output image data on the barcode.

The POS terminal 1 decodes the barcode 6 from the image data acquired by the image acquisition performed by the CCD scanner 4. The POS terminal 1 transmits the image data and decoded information to the store POS server 3 via the in-store LAN 2.

The POS terminal 1 includes operation keys 7, a purchased merchandise display section 8, a guidance display section 9, and a speaker section 10. The operation keys 7 are used by a cashier to manually directly input, for example, the numerical code of the barcode 6 attached to the item of merchandise 5.

The guidance display section 9 displays handling information required to decode the barcode 6 when an error occurs in the decoding of the barcode 6, that is, the guidance display section 9 displays a guidance message.

The speaker section 10 acoustically announces the handling information required to decode the barcode 6 when an error occurs in the decoding of the barcode 6, that is, the speaker section 10 acoustically announces the guidance message.

The store POS server 3 receives the image data and decoded information transmitted by the POS terminal 1. The store POS server 3 searches a merchandise database 11 to acquire merchandise information on the merchandise name, unit price, and the like of the item of merchandise 5 corresponding to the decoded information. The store POS server 3 returns the merchandise information on the item of merchandise 5 to the POS terminal 1.

The store POS server 3 has a handling information providing section 12. The handling information providing section 12 visually outputs or acoustically announces the guidance message required to decode the barcode 6 when an error occurs in the decoding of the barcode 6.

Upon receiving, from the POS terminal 1, a notification that an error has occurred in the decoding of the barcode 6, the handling information providing section 12 also receives the image data acquired by the image acquisition performed by the CCD scanner 4, via the in-store LAN 2.

The handling information providing section 12 analyzes a factor having caused the error in the decoding of the barcode 6 based on an image acquisition status of the barcode 6 in the image data.

The handling information providing section 12 visually outputs the guidance message required to decode the barcode 6 to the guidance display section 9 of the POS terminal 1, based on the result of the analysis of the decoding. Alternatively, the handling information providing section 12 acoustically announces the guidance message through the speaker section 10. The handling information providing section 12 may perform both visual outputting of the guidance message to the guidance display section 9 and acoustic announcement of the guidance message.

The handling information providing section 12 connects to a reference image database 13, a barcode position database 14, and a guidance database 15.

A plurality of items of reference image data on the shape of the item of merchandise 5 are pre-stored in the reference image database 13; the reference image data include at least the shape of a box, the shape of a bag, the shape of a tray, and the shapes of various kinds of fresh produce.

Figure 2:
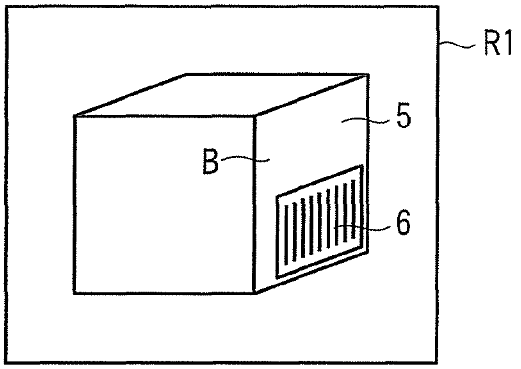
FIG. 2 is a schematic diagram showing reference image data on an item of merchandise shaped like a box and recognized by the merchandise checkout system.

FIGS. 2 to 5 show examples of reference image data R1 to R4. FIG. 2 shows an example of the reference image data R1 on the box-like item of merchandise 5. The reference image data R1 is an image of the item of merchandise 5 that is a box containing a snack. In the image of the item of merchandise 5 in the reference image data R1, the barcode 6 is attached to a side surface of a box B.

Figure 3:
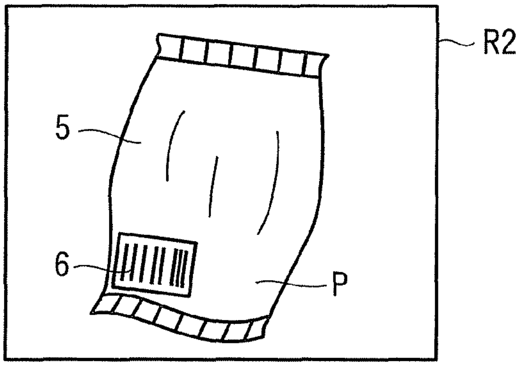
FIG. 3 is a schematic diagram showing reference image data on an item of merchandise shaped like a bag and recognized by the merchandise checkout system.

FIG. 3 shows an example of the reference image data R2 on the bag-like item of merchandise 5. The reference image data R2 is an image of the item of merchandise 5 that is a bag containing a snack. In the image of the item of merchandise 5 in the reference image data R2, the barcode 6 is attached to a back surface of a bag P.

Figure 4:
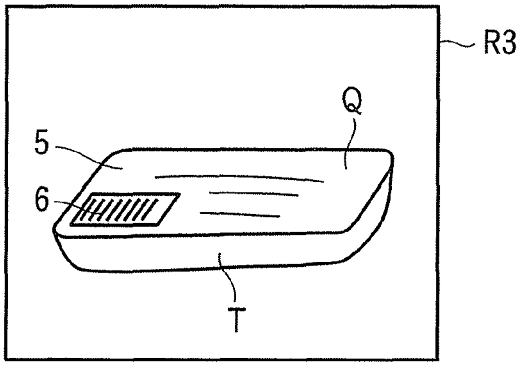
FIG. 4 is a schematic diagram showing reference image data on an item of merchandise placed on a tray recognized by the merchandise checkout system.

FIG. 4 shows an example of the reference image data R3 on the tray-like item of merchandise 5. The reference image data R3 is an image of the item of merchandise 5 that is a tray T on which fish, a vegetable, or the like is placed. The item of merchandise 5, that is, the tray T on which the fish, vegetable, or the like is placed, is covered with wrapping Q or the like. In the image of the item of merchandise 5 in the reference image data R3, the barcode 6 is attached to a surface of the wrapping Q or the like.

Figure 5:
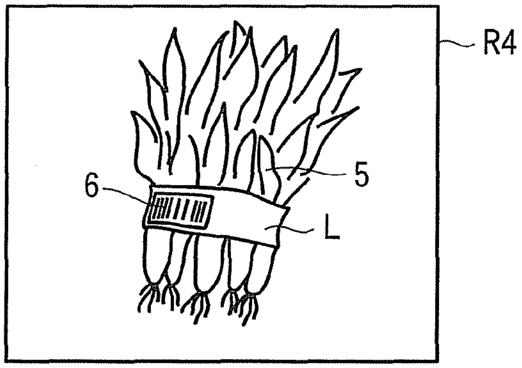
FIG. 5 is a schematic diagram showing reference image data on an item of merchandise such as fresh produce recognized by the merchandise checkout system.

FIG. 5 shows an example of the reference image data R4 on the item of merchandise 5 such as fresh produce. The reference image data R4 is an image of the item of merchandise 5 that is fresh produce such as spinach or cabbage. A band-like label L is affixed to the item of merchandise 5, for example, the fresh produce. The barcode 6 is attached to a surface of the label L.

Information on situations that prevent the barcode 6 from being decoded is pre-stored in the reference image database 13.

The situation information is stored in the reference image database 13 as reference image data. The reference image database 12 stores reference image data on a situation in which the decoding of the barcode 6 is hindered by wrinkles in the label or the like to which the barcode 6 is attached, reference image data on a situation in which the barcode 6 is blocked by the cashier's hand and thus cannot be decoded, and reference image data on a situation in which reflected light from the barcode 6 prevents the barcode 6 from being decoded.

Positional information on the barcode 6 attached to the item of merchandise 5 is pre-stored in the barcode position database 14. The positional information on the barcode 6 includes the side surface of the box B for the box-like item of merchandise 5 (FIG. 2), the back surface of the bag P for the bag-like item of merchandise 5 (FIG. 3), the surface of the wrapping Q or the like for the tray-like item of merchandise 5 (FIG. 4), and the surface of the band-like label L for the item of merchandise 5 such as the fresh produce (FIG. 5).

Guidance messages are pre-stored in the guidance database 15. The guidance messages are the contents of the guidance messages corresponding to the shape of the item of merchandise 5. The guidance messages include "hold the side surface of the item of merchandise over the scanner" for the box-like item of merchandise 5, "hold the back surface of the item of merchandise over the scanner" for the bag-like item of merchandise 5, "hold the printed part of the front of the item of merchandise over the scanner" for the tray-like item of merchandise 5, and "hold the band part or the printed part over the scanner" for the item of merchandise 5 shaped like the fresh produce.

Guidance messages allowing the barcode 6 to be decoded in the situation preventing decoding of the barcode 6 are pre-stored in the guidance database 15. For the situation in which the decoding of the barcode 6 is hindered by wrinkles in the label or the like to which the barcode 6 is attached, the guidance message is "smooth the wrinkles". For the situation in which the barcode 6 is blocked by the cashier's hand and thus cannot be decoded, the guidance message is "change the position of the hand". For the situation in which reflected light from the barcode 6 prevents the barcode 6 from being decoded, the guidance message is "change the inclination of the item of merchandise".

Figure 6:
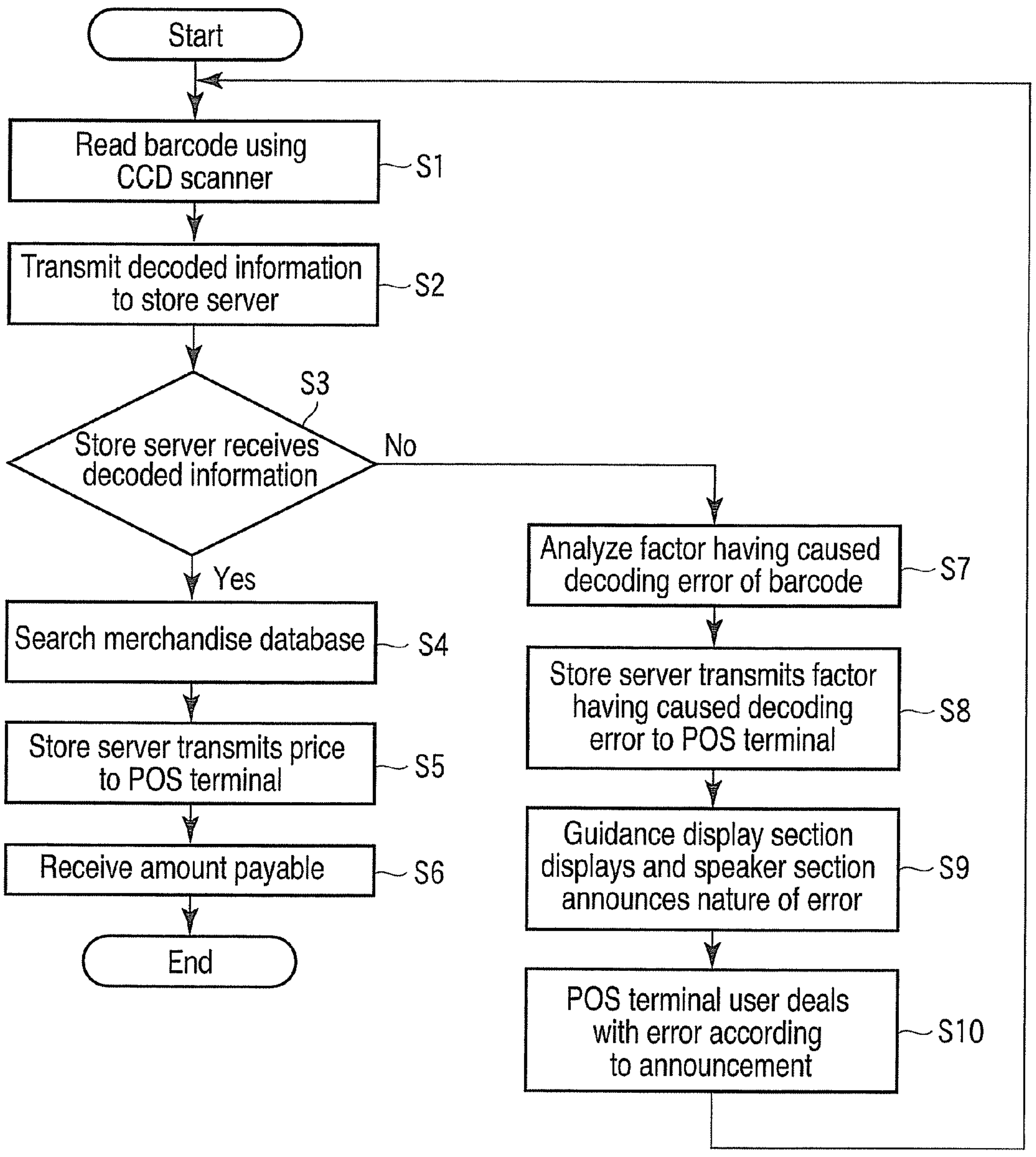
FIG. 6 is a flowchart of merchandise checkout performed by a merchandise checkout system.

Now, operation of the merchandise checkout system configured as described above will be described according to a flow chart shown in FIG. 6.

The cashier performs a scanning operation of gripping and placing the item of merchandise 5 within an image acquisition range of the CCD scanner 4 so that a surface of the item of merchandise 5 to which the barcode 6 is attached lies opposite the CCD scanner 4. At this time, in Act S1, the CCD scanner 4 acquires an image of the coded data attached to the item of merchandise 5, for example, the barcode 6, to output image data on the barcode 6.

Then, in Act S2, the POS terminal 1 decodes the barcode 6 from the image data acquired by the image acquisition performed by the CCD scanner 4. The POS terminal 1 transmits the image data and decoded information to the store POS server 3 via the in-store LAN 2.

In Act S3, the store POS server 3 receives the decoded information transmitted by the POS terminal 1 to determine whether or not the received decoded information is normal. To determine whether or not the received decoded information is normal, the store POS server 3 determines, for example, whether or not the contents of the decoded information transmitted by the POS terminal 1 match a preset format of decoded information or the like. If the store POS server 3 determines that the received decoded information is normal, the store POS server 3 shifts to Act S4 to search the merchandise database 11 to acquire merchandise information such as the merchandise name and unit price of the item of merchandise 5 corresponding to the received decoded information.

Then, in Act S5, the store POS server 3 returns, to the POS terminal 1 via the in-store LAN 2, the merchandise information such as the merchandise name and unit price of the item of merchandise 5 corresponding to the received decoded information, the merchandise information having been acquired by searching the merchandise database 11.

Then, in Act S6, the POS terminal 1 receives the merchandise information such as the merchandise name and unit price of the item of merchandise 5 returned by the store POS server 3. The POS terminal 1 displays the merchandise information such as the merchandise name and unit price of the item of merchandise 5 on the purchased merchandise display section 8 and executes a settlement process for the item of merchandise 5.

On the other hand, in Act S3, upon determining that the decoded information is not normal, the store POS server 3 shifts to Act S7 to analyze a factor having caused the error in the decoded information. The handling information providing section 12 determines whether the decoded information is not normal because of the absence of the barcode 6 in the image data acquired by the image acquisition performed by the CCD scanner 4 or because of a failure to decode the barcode 6.

If the handling information providing section 12 determines that the decoded information is not normal because of the absence of the barcode 6, the handling information providing section 12 detects the shape of the item of merchandise 5 in the image data.

Then, the handling information providing section 12 determines similarity between the shape of the item of merchandise 5 in the image data acquired by the image acquisition performed by the CCD scanner 4 and each of the item-of-merchandise shapes in the plurality of items of reference image data R1 to R4 pre-stored in the reference image database 13.

Then, the handling information providing section 12 determines the item-of-merchandise shape in the reference image data exhibiting the highest similarity to be the shape of the item of merchandise 5. When the highest similarity is exhibited between the shape of the item of merchandise 5 and the item-of-merchandise shape in the reference image data R1 shown in FIG. 2, the handling information providing section 12 determines the shape of the item of merchandise 5 to be the item-of-merchandise shape in the reference image data R1, that is, the snack contained in the box.

Then, the handling information providing section 12 uses the recognized shape of the item of merchandise 5 to search the barcode position database 14 to acquire positional information on the barcode of the item of merchandise 5.

For the item of merchandise 5 that is the snack contained in the box B, the handling information providing section 12 acquires positional information indicating that the barcode 6 is attached to the side surface of the box B.

For the item of merchandise 5 shaped like a bag, the handling information providing section 12 acquires positional information indicating that the barcode 6 is attached to the back surface of the bag P.

Then, the handling information providing section 12 searches the guidance database 15 to acquire a guidance message corresponding to the shape of the item of merchandise 5 and the positional information on the barcode 6 of the item of merchandise 5. For example, if the item of merchandise 5 is shaped like a box as shown in FIG. 2, the handling information providing section 12 searches the guidance database 15 to acquire the guidance message "hold the side surface of the item of merchandise over the scanner".

Then, in Act S8, the handling information providing section 12 transmits the guidance message "hold the side surface of the item of merchandise over the scanner" for the item of merchandise 5 shaped like a box, to the POS terminal 1.

In Act S9, upon receiving the guidance message transmitted by the store POS server 3, the POS terminal 1 visually outputs the guidance message "hold the side surface of the item of merchandise over the scanner" to the guidance display section 9. The POS terminal 1 activates the speaker section 10 to acoustically announce the guidance message.

The cashier views the guidance message "hold the side surface of the item of merchandise over the scanner" visually output to the guidance display section 9. The cashier also listens to the guidance message "hold the side surface of the item of merchandise over the scanner" acoustically announced by the speaker section 10.

Thus, the cashier performs the scanning operation according to the guidance message by holding the side surface of the item of merchandise 5 over the CCD scanner 4 within the image acquisition range of the CCD scanner 4. As a result, the POS terminal 1 normally decodes the barcode 6 from the image data acquired by the image acquisition performed by the CCD scanner 4.

If the item of merchandise 5 is shaped like a bag as shown in FIG. 3, the handling information providing section 12 acquires the guidance message "hold the back surface of the item of merchandise over the scanner". The store POS server 3 transmits the guidance message "hold the back surface of the item of merchandise over the scanner" to the POS terminal 1.

The POS terminal 1 visually outputs the guidance message "hold the side surface of the item of merchandise over the scanner" to the guidance display section 9, acoustically announces the guidance message through the speaker section 10, or performs both the visual outputting and the acoustic announcement.

If the item of merchandise 5 is shaped like a tray as shown in FIG. 4, the handling information providing section 12 transmits the guidance message "hold the printed part of the front of the item of merchandise over the scanner" to the POS terminal 1.

The POS terminal 1 visually outputs the guidance message "hold the printed part of the front of the item of merchandise over the scanner" to the guidance display section 9, acoustically announces the guidance message through the speaker section 10, or performs both the visual outputting and the acoustic announcement.

If the item of merchandise 5 is shaped like fresh produce as shown in FIG. 5, the handling information providing section 12 transmits the guidance message "hold the band part or the printed part over the scanner" to the POS terminal 1.

The POS terminal 1 visually outputs the guidance message "hold the band part or the printed part over the scanner" to the guidance display section 9, acoustically announces the guidance message through the speaker section 10, or performs both the visual outputting and the acoustic announcement.

On the other hand, in Act S7, the handling information providing section 12 determines whether or not the decoded information is not normal because of a failure to decode the barcode 6 from the image data acquired by the image acquisition performed by the CCD scanner 4.

Upon determining that the decoded information is not normal because of a failure to decode the barcode 6 contained in the image data, the handling information providing section 12 compares, in Act S8, the image data acquired by the image acquisition performed by the CCD scanner 4 with each of the reference image data stored in the reference image database 13 as situation information, for example, with the reference image data R1, R2, R3, and R4 shown in FIGS. 2 to 5.

As a result of the comparison, the handling information providing section 12 recognizes information on a situation that prevents the barcode 6 from being decoded, based on one of the reference image data R1, R2, R3, and R4 which is most similar to the image data. If the reference image data on a situation in which for example, the decoding of the barcode 6 is hindered by wrinkles in the label or the like exhibits the highest similarity, the handling information providing section 12 determines the situation to be such that the decoding of the barcode 6 is hindered by the wrinkles in the label or the like.

Then, the handling information providing section 12 recognizes the situation in which the decoding is hindered by the wrinkles in the label or the like. The handling information providing section 12 searches the guidance database 15 to acquire the guidance message "smooth the wrinkles".

Then, in Act S8, the handling information providing section 12 transmits the guidance message "smooth the wrinkles" to the POS terminal 1.

In Act S9, upon receiving the guidance message transmitted by the store POS server 3, the POS terminal 1 visually outputs the guidance message "smooth the wrinkles" to the guidance display section 9, acoustically announces the guidance message through the speaker section 10, or performs both the visual outputting and the acoustic announcement.

The cashier views the guidance message "smooth the wrinkles" visually output to the guidance display section 9. The cashier also listens to the guidance message "smooth the wrinkles" acoustically announced by the speaker section 10. Thus, the cashier smoothes the wrinkles on the label L of the item of merchandise 5 and then performs the scanning operation again by holding the barcode 6 attached to the item of merchandise 5 over the CCD scanner 4 within the image acquisition range of the CCD scanner 4. As a result, the POS terminal 1 can easily acquire an image of the barcode 6 of the item of merchandise 5. The barcode 6 attached to the item of merchandise 5 can be reliably decoded. This allows improvement of the convenience of the settlement process operation for the item of merchandise 5 and enables an increase in the efficiency of the settlement process operation.

On the other hand, upon determining the situation to be such that for example, the barcode 6 is blocked by the cashier's hand and cannot be decoded, the handling information providing section 12 transmits the guidance message "change the position of the hand" to the POS terminal 1.

The POS terminal 1 visually outputs the guidance message "change the position of the hand" to the guidance display section 9, acoustically announces the guidance message through the speaker section 10, or performs both the visual outputting and the acoustic announcement.

Upon determining the situation to be such that reflected light from the barcode 6 prevents the barcode 6 from being decoded, the handling information providing section 12 transmits the guidance message "change the inclination" to the POS terminal 1.

The POS terminal 1 visually outputs the guidance message "change the inclination" to the guidance display section 9, acoustically announces the guidance message through the speaker section 10, or performs both the visual outputting and the acoustic announcement.

The present invention is not limited to the above-described embodiment, which may be varied as described below.

In the above-described embodiment, the barcode 6 attached to the item of merchandise 5 is decoded. However, the present invention is not limited to this aspect but is applicable to decoding of a QR code attached to the item of merchandise 5.

The information on the situation preventing the decoding of the barcode 6 which information is stored in the reference image database 13 is not limited to the reference image data on the shape of the box, the shape of the bag, the shape of the tray, the shapes of the various kinds of fresh produce, the wrinkles in the label L or the like to which the barcode 6 is attached, the condition in which the barcode 6 is blocked by the cashier's hand, and the condition in which reflected light from the barcode 6 prevents the barcode 6 from being decoded. For example, the stored information on the situation preventing the decoding of the barcode 6 may be reference image data on the shapes of other items of merchandise 5 and reference image data on other pieces of situation information. Accordingly, additional contents of guidance messages may be stored in the guidance database 15 depending on the shapes of the items of merchandise 5 and the other pieces of situation information.

In the above-described embodiment, the handling information providing section 12 is provided in the store server 3. However, the present invention is not limited to this aspect. The handling information providing section 12 may be provided in the POS terminal 1.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A merchandise checkout system, comprising:

an image acquisition section configured to acquire at least coded data attached to an item of merchandise;

a decoder configured to decode the coded data from image data acquired by the image acquisition section; and a handling information providing section configured to, in response to occurrence of an error of the decoder while decoding the coded data, perform an analysis of the error based on an image acquisition status of the coded data and, in response to a determination that the coded data is not contained in the image data, provide a first handling information corresponding to a shape of the item of merchandise, and, in response to a determination that the decoder fails to decode the coded data, allow establishment of a situation in which the decoder successfully decodes the coded data depending on a result of the analysis.

2. The merchandise checkout system according to claim 1, wherein the handling information providing section is further configured to, in response to recognizing the shape of the item of merchandise contained in the image data, provide positional information on a position on the item of merchandise where the coded data is attached to the item of merchandise, depending on the shape of the item of merchandise.

3. The merchandise checkout system according to claim 2, further comprising:

a reference image database configured to store reference image data on a situation in which decoding of the coded data is hindered;

wherein the handling information providing section is further configured to, in response to determining that the decoder fails to decode the coded data contained in the image data, perform a comparison of the reference image data and the image data and provide second handling information that allows establishment of a situation in which the decoder successfully decodes the coded data based on a result of the comparison.

4. The merchandise checkout system according to claim 1, wherein the handling information providing section is configured to recognize at least one of a shape of a box, a shape of a bag, a shape of a tray, or shapes of produce to yield an item recognition, and to provide the first handling information based on the item recognition.

5. The merchandise checkout system according to claim 1, wherein the handling information providing section is configured to at least one of visually output or acoustically announce a guidance message for at least one of the first handling information or the second handling information.

6. A handling information providing method for merchandise checkout, comprising:

acquiring at least coded data attached to an item of merchandise to acquire image data on the coded data;

decoding the coded data;

in response to determining that the coded data is not contained in the image data, providing a first handling information corresponding to a shape of the item of merchandise; and in response to determining an error in connection with the decoding, allowing establishment of a situation in which the decoding successfully decodes the coded data depending on a result of an analysis of the error.

7. The handling information providing method according to claim 6, further comprising, in response to determining that the decoding fails to decode the coded data contained in the image data, recognizing at least one of a shape of a box, a shape of a bag, a shape of a tray, or a shape of produce to yield a recognized shape, and providing the first handling information corresponding to the recognized shape.

8. The handling information providing method according to claim 6, further comprising providing the first handling information as at least one of visual output or an acoustic announcement.

* * * * *